March 18, 1924.

R. T. DIAL

FLOSS CONTAINER AND PASTE EXPRESSOR

Filed Nov. 3, 1922

1,487,215

Inventor.
Richard T. Dial
By John A. Saul
Attorney.

Patented Mar. 18, 1924.

1,487,215

UNITED STATES PATENT OFFICE.

RICHARD TOZER DIAL, OF COLUMBIA, SOUTH CAROLINA.

FLOSS CONTAINER AND PASTE EXPRESSOR.

Application filed November 3, 1922. Serial No. 598,797.

*To all whom it may concern:*

Be it known that I, RICHARD T. DIAL, a citizen of the United States, residing at Columbia, in the county of Richland and State of South Carolina, have invented certain new and useful Improvements in Floss Containers and Paste Expressors, of which the following is a specification.

My invention relates to a combined paste expressor for collapsible tubes and a floss silk container, by means of which the paste tube may be engaged and rolled so that its contents may be completely expelled. The roller which constitutes the paste expressor is hollow and is adapted to receive dental floss, and has a cutter to sever the same as it is used.

The object of the invention is to so construct the same that it will be simple, cheap, durable, efficient, and easily manufactured.

In the drawings forming a part of this specification, and in which like symbols of reference represent corresponding parts in the several views:—

Figure 1:
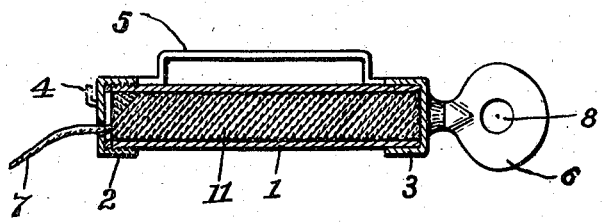
Figure 1 is a longitudinal, sectional view, showing the dental floss in the same.

In the drawings, 1 represents the tube for carrying the dental floss; 2 a detachable cover or cap for the same; 3 a rigid cap for the other end of the tube; and 4 a cutter for the purpose of severing the dental floss, or the like. 5 is a staple, or the like, connected to the side of the floss holder, the object of the same being to receive the end of the tube and hold the same while it is coiled around the floss tube and its contents expressed.

Figure 2:
Figure 2 is a top view of the same.
Figure 3:
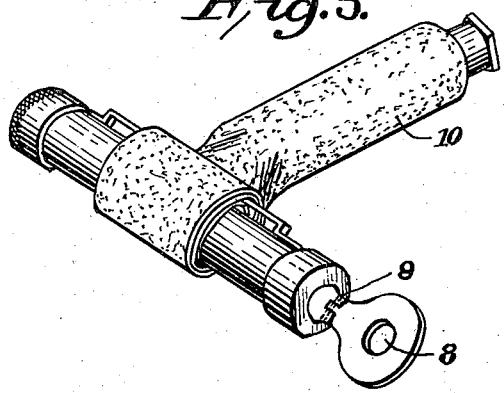
Figure 3 is a perspective view, showing the tube engaged by the expressor.

6 is a thumb-piece, or handle, to rotate the tube, the same being shown in Figures 1 and 2 as rigidly connected to the tube; and in Figure 3 being hinged at 9 to the same. It is generally preferred to have it rigid with the end of the tube as it is more easily operated; but, of course, it could, if desired, be hinged as shown in Figure 3. 7 indicates the dental floss; 8 a hole in the thumb-piece 6 by means of which it may be suspended from a nail or peg; or it may be suspended by its reduced neck, which is preferably the diameter of a tooth-brush neck, so that it may be supported from a tooth-brush hanger. 10 represents the paste tube as it is being acted upon by the expressor. The top 2 is shown as screwed onto the tube, but of course it may be otherwise connected, if desired.

The operation of the device will be apparent from the foregoing description. The dental floss is placed in the tube, and when it is desired for use it is simply fed or drawn from the same and severed by the knife. When the paste is desired the bottom of the paste tube is placed in the piece 5 and by rotating the floss holder the contents of the paste tube is forced from the same.

Having now fully described my invention, what I claim as new, and desire to secure by Letters-Patent, is:—

1. In a device of the character described, a receptacle for dental floss, or the like, and means connected with the receptacle to engage and express the contents from a collapsible tube.

2. A dental floss container, provided with a detachable cap having a perforation for the floss, and means for engaging a collapsible tube, said means consisting of a U-shaped bar connected with the tube.

3. A dental floss container, provided with a handle to rotate the same, and means for engaging a collapsible tube.

In testimony whereof I affix my signature.

RICHARD TOZER DIAL.